(12) United States Patent
Straatveit

(10) Patent No.: US 7,330,840 B2
(45) Date of Patent: Feb. 12, 2008

(54) METHOD AND APPARATUS FOR GENETIC, FUZZY DESIGN

(75) Inventor: Sverre Nils Straatveit, White Plains, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 65 days.

(21) Appl. No.: 11/369,060

(22) Filed: Mar. 7, 2006

(65) Prior Publication Data

US 2006/0224527 A1    Oct. 5, 2006

Related U.S. Application Data

(60) Provisional application No. 60/668,665, filed on Mar. 31, 2005.

(51) Int. Cl.
G06N 5/00 (2006.01)

(52) U.S. Cl. ............................. 706/13; 706/52; 706/10; 707/5

(58) Field of Classification Search ................. 706/13, 706/52, 10; 707/5
See application file for complete search history.

(56) References Cited

U.S. PATENT DOCUMENTS

| | | | | |
|---|---|---|---|---|
| 5,051,932 A | * | 9/1991 | Inoue et al. | 707/5 |
| 5,251,285 A | * | 10/1993 | Inoue et al. | 706/10 |
| 5,377,308 A | * | 12/1994 | Inoue et al. | 706/52 |

OTHER PUBLICATIONS

Goodwin, R., "Ambiguity-Resistant Tree-and Four-Channel Interferometers", Naval Research Laboratory Report 8005, Sep. 9, 1976.

Malloy, N. J., "Analysis and Synthesis of General Planar Interferometer Arrays", IEEE ICASSP 1983.

Oxley, R. D., "High-Resolution, Six-Channel Interferometer Development and Performance", *Naval Research Laboratory Report 9260*, Sep. 21, 1990.

Abramovich, Y.I. and Spencer, N.K., "Optimisation Methods in Nonuniform Linear Antenna Array Design and Signal Processing, Proc. International Conference on Optimization: Techniques & Applications", Perth, Australia, pp. 1039-1046, vol. 2, 1, July.

(Continued)

*Primary Examiner*—Wilbert L Starks, Jr.
(74) *Attorney, Agent, or Firm*—John J. Karasek; Suresh Koshy

(57) ABSTRACT

An apparatus including a genetic processor receiving a plurality of genomes, each genome of the first plurality of genomes including at least one of a device, a method, and an article of manufacture, wherein each genome comprises at least one gene, each gene comprising at least one allele; and a fuzzy logic scorer communicating with the genetic processor to score the plurality of genomes using fuzzy logic-based fitness criteria thereby obtaining a genomic score for each genome of the plurality of genomes and an average generational score. The genetic processor eliminates any genome of the plurality of genomes that has a score below a level to provide a remaining plurality of genomes and generates another plurality of genomes by mating the remaining plurality of genomes using a genetic algorithm. Optionally, the apparatus further includes a mutation generator communicating with the genetic processor and at least one of eliminating the gene in the remaining plurality of genomes; introducing at least one of a new gene and a new allele to characterize each genome of the remaining plurality of genomes; and wherein the at least one gene comprises at least one of an active gene and an inactive gene one of inactivating the active gene and activating the inactive gene of the at least one gene in at least one mutated genome of the remaining plurality of genomes.

22 Claims, 3 Drawing Sheets-

OTHER PUBLICATIONS

Zoltowski, M. D. and Mathews, C. P., "Beamspace Root-MUSIC for Rectangular Arrays, Circular Arrays, and Nonredundant Linear Arrays", IEEE 1991, p. 556.

Wax, M., "Direction Finding of Coherent Signals via Spatial Smoothing for Uniform Circular Arrays" *IEEE Transaction on Antennas and Propagation*, vol. 42, No. 5, May 1994, p. 613-620.

Wong, K. T. and Zoltowski, M. D., "Direction-Finding with Sparse Rectangular Dual-Size Spatial Invariance Array", IEEE Transactions on Aerospace and Electronic Systems, vol. 34, No. 4. Oct. 1998, p. 1320-1335.

Murphy, S. and Eyring, P. M., "2-18 GHz Circular Array Interferometer DF Antenna System," IEEE 1998 p. 2332.

Pace, P., Wickersham, D. and Jenn, N. Y., "High Resolution Phase Sampled Interferometry Using Symmetrical Number Systems," IEEE Transactions on Antennas and Propagation, vol. 49, No. 10, Oct. 2001.

Jenn, D.C., Pace, P.E., Hatziathanasiou and Vital, R., "High resolution wideband direction finding arrays based on optimum symmetrical number system encoding", IEE Electronic Letters, May 28, 1998, vol. 34, No. 11.

Austeng, A. and Holm, S., "1D and 2D Algorithmically Optimized Sparse Arrays", to appear in Proc. IEEE Ultrasonic Symp., Toronto, Oct. 1997.

Dybdal, R. B. and Rousseau, P. R., resolution of Interferometric Ambiguities, IEEE, p. 1964.

Moffet, A. T., "Minimum-Redundancy Linear Arrays," IEEE Transactions on antennas and propagation, vol. AP-16,, No. 2, Mar. 1968.

Brookner, E., Multidimensional Ambiguity Functions of Linear, Interferometer, Antenna Arrays, IEEE Transactions on Antennas and Propagation, Sep. 1964, p. 551.

Johnson, D. and Dudgeon, D., "Array Signal Processing," Prentice Hall Signal Processing Series, 1993, p. 77-110.

Hoctor, R. T. and Kassam, S. A., "Array Redundancy for Active Line Arrays," IEEE Transaction on Image Processing, vol. 5, No. 7, Jul. 1996.

Mariotti, J.M. and Ridgway, S.T., Double Fourier spatio-spectral interferometry: combining high spectral and high spatial resolution in the near infrared, Astron. Astrophys. 195, 1988, p. 350-363.

Meurisse, Y. and Delmas, J. P., "Bounds for Sparse Planar and Volume Arrays," IEEE Transactions on Information Theory, vol. 47, No. 1, Jan. 2001.

Marais, K. and Sedwick, R., "The Development and Analysis of Scanned Pattern Interferometric Radar," Sep. 2001, Master's Degree.

Sleiman, A. and Manikas, A., Antenna Array Manifold: A simplified Representation IEEE Proceedings of ICASSP, vol. 5, pp. 3164-3167, Jun. 2000.

Manikas, A., Sleiman, A. and Dacos, I., *Manifold Studies of Nonlinear Antenna Array Geometries*, IEEE Transactions on Signal Processing, p. 497-506, vol. 49 No. 2, Mar. 2001.

Lee, Y.H., Cahill, B.J., Porter, S.J. and Marvin, A.C., A Novel Evolutionary Learning Technique for Multi-Objective Array Antenna Optimization, Progress in Electromagnetics Research, Pier 48, 125-144, 2004.

Hornby,G.S., "Evolvable Hardware, Using Evolutionary Computation to Design and Optimize Hardware Systems," IEEE Computational Intelligence Magazine, vol. 1 No. 1 Feb. 2006, p. 19.

Coello, C. A., "Evolutionary Multi-Objective Optimization", IEEE Computational Intelligence Magazine, vol. 1, No. 1, Feb. 2006, p. 28.

Sugeno, M, and Yasukawa,T., A Fuzzy-Logic-Based approach to Qualitative Modeling,: IEEE Transactions on Fuzzy Systems, vol. 1, No. 1, Feb. 1993.

Warburton, D., "How to Design Fuzzy Logic Controllers," Machine Design, Nov. 26, 1993.

Straatveit, N. S., "Direction-of arrival interferometer array design using genetic algorithm with fuzzy logic," Intelligent Computing: Theory and Applications II conference, SPIE Defense and Security Symposium, Apr. 2004.

\* cited by examiner

US 7,330,840 B2

METHOD AND APPARATUS FOR GENETIC, FUZZY DESIGN

RELATED APPLICATION

This application is related to and claims the benefit of the filing date of the following United States Provisional patent application: (1) Provisional Application No. 60/668,665, entitled METHOD AND ALGORITHMS FOR DIRECTION-OF-ARRIVAL INTERFEROMETER ANTENNA ARRAY DESIGN, filed on 31 Mar. 2005. This application is assigned to the same assignee as the present application.

TECHNICAL FIELD

This invention relates generally to a method and apparatus for genetic design of apparatuses, processes, and articles of manufacture, and more particularly to a method and apparatus for genetic design of antenna arrays.

DESCRIPTION OF THE RELATED ART

The history of antenna array geometry design has been formulated as an optimization problem, and further identified as an integer multi-criteria optimization problem. Representative attempts at antenna array geometry design include, for example: Robert L. Goodwin, "Ambiguity-Resistant Three- and Four-Channel Interferometers," Naval Research Laboratory Report 8005, Sep. 9, 1976, incorporated herein by reference; Neil J. Malloy, "Analysis and Synthesis of General Planar Interferometer Arrays", IEEE ICASSP 1983, incorporated herein by reference; Roger D. Oxley, "High-Resolution, Six-Channel Interferometer Development and Performance," Naval Research Laboratory Report 9260, Sep. 21, 1990, incorporated herein by reference; Y. I. Abramovich and N. K. Spencer, Optimisation Methods in Nonuniform Linear Antenna Array Design and Signal Processing, Proc. International Conference on Optimization: Techniques & Applications, Perth, Australia, pp. 1039-1046, vol.2, 1, July 1998, incorporated herein by reference; Michael D. Zoltowski, Cherian P Mathews, Beamspace Root-MUSIC for Rectangular Arrays, Circular Arrays, and Nonredundant Linear Arrays, IEEE 1991, page 556, incorporated herein by reference; Mati Wax, "Direction Finding of Coherent Signals via Spatial Smoothing for Uniform Circular Arrays" IEEE Transaction on Antennas and Propagation, Vol.42, No 5, May 1994, page 613-620, incorporated herein by reference; Kainam Thomas Wong, Michael D. Zoltowski, "Direction-Finding with Sparse Rectangular Dual-Size Spatial Invariance Array", IEEE Transactions on Aerospace and Electronic Systems, Vol. 34, No 4, October 1998, page 1320-1335, incorporated herein by reference; Steven Murphy, Paul M. Eyring, "2-18 GHz Circular Array Interferometer DF Antenna System," IEEE 1998 page 2332, incorporated herein by reference; P. Pace, D. Wickersham, D. Jenn, N. York, "High Resolution Phase Sampled Interferometry Using Symmetrical Number Systems," IEEE Transactions on Antennas and Propagation, Vol. 49, No. 10, October 2001, incorporated herein by reference; D. C. Jenn, P. E. Pace, T. Hatziathanasiou and R. Vitale, "High resolution wideband direction finding arrays based on optimum symmetrical number system encoding", IEE Electronic Letters, 28 May 1998, Vol. 34, No. 11; incorporated herein by reference; Andreas Austeng, Sverre Holm, . . . , "1D and 2D Algorithmically Optimized Sparse Arrays", to appear in Proc. IEEE Ultrasonic Symp., Toronto, October 1997, incorporated herein by reference.

Other characteristics of the problem come from radio astronomers who used interferometry principles and studied array redundancy. Examples include: R B Dybdal, P R Rousseau, Resolution of Interferometric Ambiguities, IEEE, page 1964, incorporated herein by reference; Alan T. Moffett, "Minimum-Redundancy Linear Arrays," IEEE Transactions on Antennas and Propagation, Vol. AP-16, NO. 2, March 1968, incorporated herein by reference; Eli Brookner, Multidimensional Ambiguity Functions of Linear, Interferometer, Antenna Arrays, IEEE Transactions on Antennas and Propagation, September 1964, page 551, incorporated herein by reference; Don Johnson and Dan Dudgeon, "Array Signal Processing," Prentice Hall Signal Processing Series, 1993, incorporated herein by reference; Ralph T. Hoctor, Saleem A. Kassam, "Array Redundancy for Active Line Arrays," IEEE Transaction on Image Processing, Vol. 3, No. 7, July 1996, incorporated herein by reference; J M Mariotti, S T Ridgway, Double Fourier spatio-spectral interferometry: combining high spectral and high spatial resolution in the near infrared, Astron. Astrophys. 195, 1988, page 350-363, incorporated herein by reference; Yann Meurisse, Jean-Pierre Delmas, "Bounds for Sparse Planar and Volume Arrays," IEEE Transactions on Information Theory, Vol. 47, No. 1, January 2001, incorporated herein by reference; Karen Marais, Raymond Sedwick, "The Development and Analysis of Scanned Pattern Interferometric Radar," September 2001, Master's Degree, incorporated herein by reference.

More recently, sensitivity analysis of the array manifold and its differential geometry may be used as a criterion for array geometry evaluation. Examples include: Sleiman A. and Manikas A. Antenna Array Manifold: A Simplified Representation IEEE Proceedings of ICASSP, Vol. 5, pp.3164-3167, June 2000, incorporated herein by reference; Athanassios Manikas, Adham Sleiman, Ioannis Dacos, Manifold Studies of Nonlinear Antenna Array Geometries, IEEE Transactions on Signal Processing, pg. 497-506, Vol. 49, No. 3, March 2001, incorporated herein by reference; Sleiman A. and Manikas A., The Impact of Sensor Positioning on the Array Manifold, IEEE Transactions on Antennas and Propagation, Vol.51, No.9, September 2003, incorporated herein by reference; Y. H. Lee, B. J. Cahill, S. J. Porter, and A. C. Marvin, A Novel Evolutionary Learning Technique for Multi-Objective Array Antenna Optimization, Progress In Electromagnetics Research, PIER 48, 125-144, 2004, incorporated herein by reference.

As the above-mentioned design attempts suggest, these array design tools are complex, math-intensive and do not address the necessary breadth of system design, for example, if cost as well as performance need to be addressed in concert. Typically, each particular aspect of the design is pursued by either executing exhaustive search computer programs or cumbersome analytic methods. These piecemeal approaches must then be iterated in a search for a design that might meet requirements for all criteria. Further complicating the problem is that the design criteria are often represented by distinctly different units of measure.

SUMMARY OF THE INVENTION

An embodiment of the invention includes a method. In Step (a), a plurality of genomes is scored using fuzzy logic-based fitness criteria to obtain a genomic score for each genome of the plurality of genomes and an average generational score, wherein each genome of the first plurality of genomes comprises at least one of an apparatus, a process, and an article of manufacture, wherein each genome comprises at least one gene, each gene comprising at least one allele. In Step (b), any genome of the plurality of genomes having a score below a level is eliminated to provide a remaining plurality of genomes. In Step (c), another plurality of genomes is generated by mating the remaining plurality of genomes using a genetic algorithm. In Step (d), steps (a) through (c) are repeated until the average generational score achieves an asymptote thereby yielding a plurality of optimized genomes.

Optionally, the fuzzy logic-based fitness criteria include at least one of a plurality of disparate units of measurement, a plurality of disparate dynamics, and at least one design methodology. Optionally, the at least one design methodology comprises resolution, redundancy elimination, differential geometry, Chinese remainder theorem, symmetric number system, and pair-wise relatively prime numbers system.

Optionally, step (c) includes at least one of: eliminating the gene in the remaining plurality of genomes; adding at least one new fitness criterion to the fuzzy logic-based fitness criteria; introducing at least one of a new gene and a new allele to characterize each genome of the remaining plurality of genomes; and wherein the at least one gene comprises at least one of an active gene and an inactive gene, one of inactivating the active gene and activating the inactive gene of the at least one gene to generate at least one mutated genome of the remaining plurality of genomes.

Optionally, the method further includes assigning to each genome of the remaining plurality of genomes a relative probability of mating with another genome of the remaining plurality of genomes. Optionally, the assigned relative probability is higher for higher scoring genomes of the remaining plurality of genomes than for lower scoring genomes of the remaining plurality of genomes.

Optionally, the scoring step (a) comprises: fuzzifying fitness criterion measurements using a plurality of membership functions; generating a plurality of pair-wise fitness criterion combinations using at least one of fuzzy associative memory and at least one fuzzy logic rule; and defuzzifying a fuzzy score for each genome of the plurality of genomes. The plurality of membership functions includes, for example, a plurality of trapezoidal membership functions, a plurality of sigmoidal membership functions, or a plurality of triangular membership functions. Optionally, the defuzzying step is performed using at least one of a centroid method, an average of maxima method, a center of singleton method, a mean of maximum method, a smallest of maximum method, and a largest of maximum method.

Optionally, the apparatus includes at least one of an antenna and an antenna array. Optionally, the antenna includes at least one of a direction-of-arrival interferometer linear array, a direction-of-arrival interferometer circular array, a direction-of-arrival interferometer planar array, and a direction-of-arrival interferometer volumetric array.

Optionally, the at least one gene comprises an array element position, wherein an active gene represents an active array element and an inactive gene represents an inactive array element.

Another embodiment of the invention includes an apparatus including a genetic processor receiving a plurality of genomes, each genome of the first plurality of genomes including at least one of a device, a method, and an article of manufacture, wherein each genome comprises at least one gene, each gene comprising at least one allele; and a fuzzy logic scorer communicating with the genetic processor to score the plurality of genomes using fuzzy logic-based fitness criteria thereby obtaining a genomic score for each genome of the plurality of genomes and an average generational score. The genetic processor eliminates any genome of the plurality of genomes that has a score below a level to provide a remaining plurality of genomes and generates another plurality of genomes by mating the remaining plurality of genomes using a genetic algorithm.

Optionally, the fuzzy logic-based fitness criteria comprise at least one of a plurality of disparate units of measurement, a plurality of disparate dynamics, and at least one design methodology. Optionally, the at least one design methodology comprises resolution, redundancy elimination, differential geometry, Chinese remainder theorem, symmetric number system, and pair-wise relatively prime numbers system.

Optionally, the apparatus further includes a mutation generator communicating with said genetic processor and at least one of eliminating the gene in the remaining plurality of genomes; introducing at least one of a new gene and a new allele to characterize each genome of the remaining plurality of genomes; and wherein the at least one gene comprises at least one of an active gene and an inactive gene one of inactivating the active gene and activating the inactive gene of the at least one gene in at least one mutated genome of the remaining plurality of genomes.

Optionally, the genetic processor assigns to each genome of the remaining plurality of genomes a relative probability of mating with another genome of the remaining plurality of genomes. Optionally, the assigned relative probability is higher for higher scoring genomes of the remaining plurality of genomes than for lower scoring genomes of the remaining plurality of genomes.

Optionally, the fuzzy logic scorer includes at least one of fuzzifies fitness criterion measurements using at least one membership function; generates a plurality of pair-wise fitness criterion combinations using at least one fuzzy logic rule; and defuzzifies a fuzzy score for each genome of the plurality of genomes using a centroid method. The at least one membership function includes, for example, at least one trapezoidal membership function, at least one sigmoidal membership function, or at least one triangular membership function.

Optionally, the device includes at least one of an antenna and an antenna array. Optionally, the antenna includes at least one of a direction-of-arrival interferometer linear array, a direction-of-arrival interferometer circular array, a direction-of-arrival interferometer planar array, and a direction-of-arrival interferometer volumetric array. Optionally, the at least one gene comprises an array element position, wherein an active gene represents an active array element and an inactive gene represents an inactive array element.

Optionally, an embodiment of the invention allows succinct inclusion of advances into an array design process. Optionally, an embodiment of the invention produces designs which integrate disparate criteria, optimize conflicting criteria, and/or support the addition of future design criteria, for example, array manifold analysis using differential geometry.

BEST MODES FOR CARRYING OUT THE INVENTION

Figure 1:
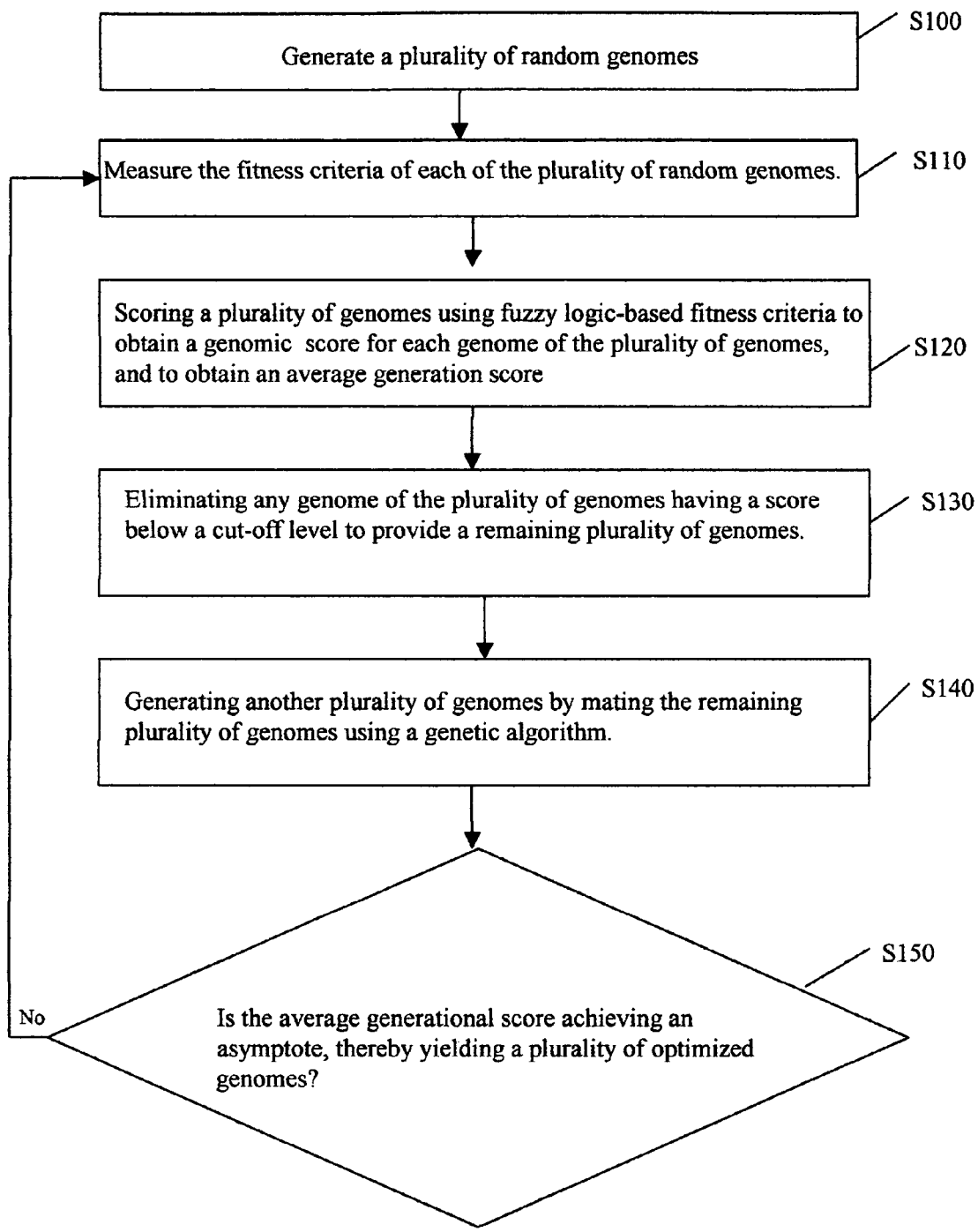
FIG. 1 is an illustrative flow chart of an embodiment of the invention.

An embodiment of the invention includes a method, referring to FIG. 1. In Step S100, a plurality of random genomes is generated. In Step S110, the fitness criteria for each random genome in the plurality of random genomes is measured. In Step S120, the plurality of genomes is scored using fuzzy logic-based fitness criteria to obtain a genomic score for each genome of the plurality of genomes and an average generational score, wherein each genome of the first plurality of genomes comprises at least one of an apparatus, a process, and an article of manufacture, wherein each genome comprises at least one gene, each gene comprising at least one allele. In Step S130, any genome of the plurality of genomes having a score below a level is eliminated to provide a remaining plurality of genomes. In Step S140, another plurality of genomes is generated by mating the remaining plurality of genomes using a genetic algorithm. In Step S150, steps S110 through S140 are repeated until the average generational score achieves an asymptote thereby yielding a plurality of optimized genomes.

Figure 2:
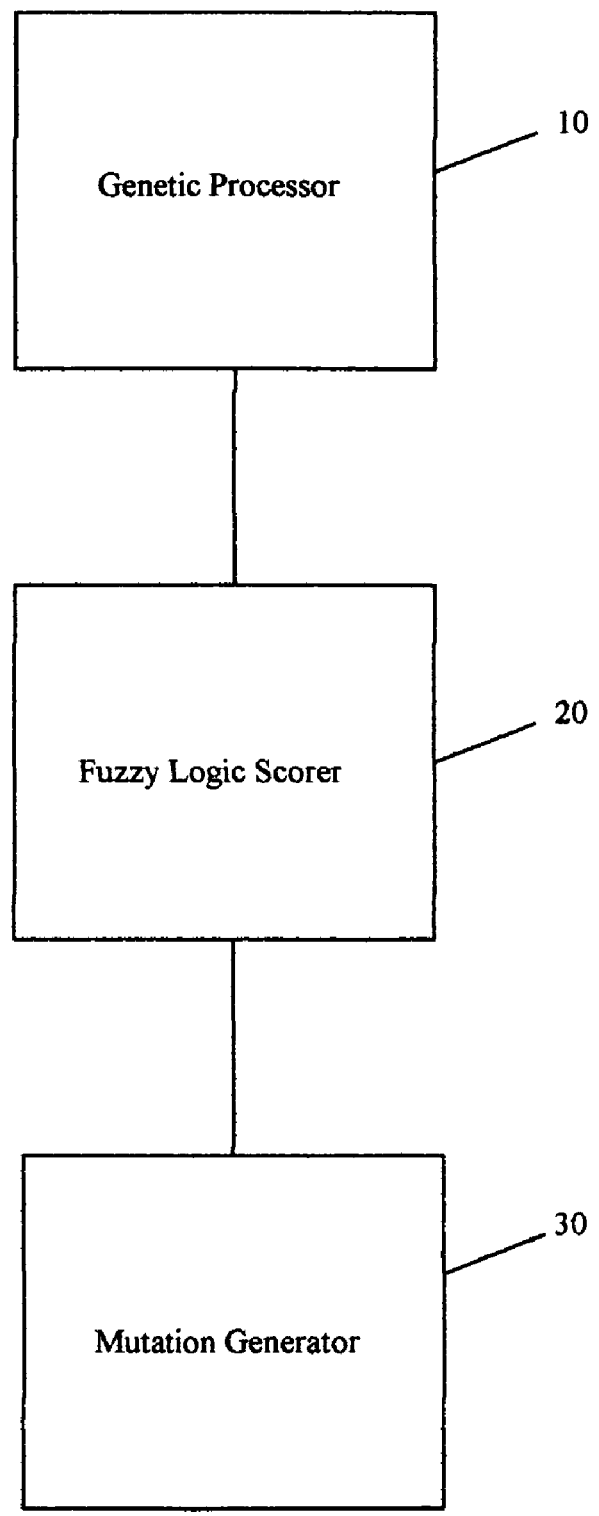
FIG. 2 is an illustrative block diagram of an embodiment of the invention.

Another embodiment of the invention includes an apparatus, referring to FIG. 2, The apparatus includes a genetic processor 10 receiving a plurality of genomes, each genome of the first plurality of genomes including at least one of a device, a method, and an article of manufacture, wherein each genome comprises at least one gene, each gene comprising at least one allele. The apparatus also includes a fuzzy logic scorer 20 communicating with the genetic processor 10 to score the plurality of genomes using fuzzy logic-based fitness criteria thereby obtaining a genomic score for each genome of the plurality of genomes and an average generational score. The genetic processor 10 eliminates any genome of the plurality of genomes has a score below a level to provide a remaining plurality of genomes and generates another plurality of genomes by mating the remaining plurality of genomes using a genetic algorithm.

The apparatus further includes a mutation generator 30 communicating with the genetic processor and at least one of eliminating the gene in the remaining plurality of genomes; introducing at least one of a new gene and a new allele to characterize each genome of the remaining plurality of genomes; and wherein the at least one gene comprises at least one of an active gene and an inactive gene one of inactivating the active gene and activating the inactive gene of the at least one gene in at least one mutated genome of the remaining plurality of genomes.

Using the example of an antenna array design, illustrative examples of genomes include: representation of antenna element characteristics; and/or extent of the number of antenna element.

Illustrative examples of genes for such genomes include: element placement in array; element activation i.e., on or off; element receive pattern; element physical size; element mutual coupling; element frequency range; element frequency response; element failure rates; element temperature sensitivity; and/or element shadowing impact.

Illustrative examples of alleles for each such gene include: 1-dimension space; 2-dimension space; 3-dimension space; complex-dimension space; receiving sensitivity, mutual coupling sensitivity; and/or frequency response characteristics.

Illustrative examples of genetic algorithms are found in: ST5 evolved antennas, such as described in Gregory S. Hornby, "Evolvable Hardware, Using Evolutionary Computation to Design and Optimize Hardware Systems," IEEE Computational Intelligence Magazine, Volume 1, Number 1, February 2006, Page 19, incorporated herein by reference; Carlos A. Coello, "Evolutionary Multi-Objective Optimization", IEEE Computational Intelligence Magazine, Volume 1, Number 1, February 2006, page 28, incorporated herein by reference, and Y. H. Lee, B. J. Cahill, S. J. Porter, and A. C. Marvin, A Novel Evolutionary Learning Technique for Multi-Objective Array Antenna Optimization, Progress In Electromagnetics Research, PIER 48, 125-144, 2004

Illustrative examples of fuzzy logic technology appropriate for the instant invention are found, for example, in Michio Sugeno, Takahiro Yasukawa, "A Fuzzy-Logic-Based Approach to Qualitative Modeling," IEEE Transactions on Fuzzy Systems, Vol. 1, No. 1, February 1993, incorporated herein by reference; David Warburton, "How to Design Fuzzy Logic Controllers," Machine Design, Nov. 26, 1993, incorporated herein by reference; and S. Nils Straatveit, "Direction-of-arrival interferometer array design using genetic algorithm with fuzzy logic," Intelligent Computing: Theory and Applications II Conference, SPIE Defense and Security Symposium, April 2004, incorporated herein by reference.

In operation, using antenna array design as an illustrative use, the instant invention initiates the process by generating randomized array configurations which are the genomes in the genetic algorithm. The genomes or potential array designs are then evaluated or scored by a fitness function, which contains different design requirements. Results are scored using fuzzy logic. The genetic algorithm uses the best-fit of the genomes as determined by their score of the population to produce the next generation of genomes, in this case antennas. A mutation function introduces randomness in a percentage of the genomes. The overall population score is examined. If it has increased by a threshold value then the size of the genome is increased until the final allowed genome size is consistent with the desired array resolution requirement.

Another embodiment of the invention is described as follows. The approach is based on utilizing a genetic algorithm to enhance and automate the design space search process. Since there are many different types of units involved in the evaluation criteria fuzzy logic is used to enable scoring, and simulation software is needed to create the environment for operating the genetic algorithm. The simulation software creates the impinging waveform, for selected angles of arrival, with the time delays each antenna element would see in the real environment.

A genetic algorithm works by evaluating a population of genomes against fitness criteria. Fitness criteria are discussed in the next section. The most fit individuals or genomes survive to produce the next generation. This process can be stopped when the population reaches a performance asymptote. Here each genome represents an antenna with its genes designating antenna element positions. Each gene is on or off to indicate if that antenna element is active or not. The entire population is represented as a binary array for processing. The population size is controlled by the operator.

There are three reasons for using fuzzy logic in this array design process. Fuzzy logic can apply when a precise mathematical model of a complex system cannot be obtained. Second in the described process the factors characterizing the system, the fitness criterion, are in different types of units. And finally, the system design requirements present multiple conflicting objectives, for example, low cost versus high resolution.

Another benefit of fuzzy logic scoring is its inherent parallel structure, which allows other evaluation criteria to be succinctly added. This is done by creating another membership function and adding more rules. Since antenna design technology is still advancing this will be especially useful.

The fitness criterion for use in accordance with this embodiment of the invention is a count of the number of active elements. The genome model locates antenna elements on a uniform half-wavelength-spaced grid. The grid includes, for example, a binary matrix of genomes or arrays on the vertical axis with their genes or array elements on the horizontal axis. For instance, active elements conceptually are dark; inactive elements are not. An element's location on the grid is indicated by its location in the binary matrix.

A system with fewer elements and therefore reduced channel count will be lower cost. As mentioned before, this is accomplished as the mutation function removes elements from the grid even as the genome size and possible number of elements is increased. Note that the mutation function can also turn on inactive elements. As elements are deactivated a sparsely populated array is in effect modeled. The operator can choose the beginning genome size and the final genome size. Final genome size can represent the desired resolution discussed next.

As to resolution, interferometer spatial accuracy ($\sigma_\theta$) in degrees rms is determined primarily by the electrical phase error ($\sigma_E$ in degrees rms) and the electrical length d (in wavelengths) of the largest-spaced element pair[4].

$$\sigma_\theta = \lambda \sigma_E/(2\pi d \cos \theta)$$

$$d = \lambda \sigma_E/(\sigma_\theta 2\pi)$$

For example, to attain 0.1 degrees of resolution while suffering a 12 degree electrical phase error, implies 40 half-wavelength-spaced elements are necessary. This criterion is a measure of the half-wavelength distance between the farthest spaced elements.

Concerning redundancy, maximum resolution is, for example, achieved for a given number of elements by reducing the number of redundant spacing present in the array. If an array has more than one pair of sensors separated by the same lag, these pairs produce redundant estimates of the covariance function at that lag. In this case, the co-array of that array is said to have redundancies. Since maximizing resolution and reducing the number of sensors (antenna elements) are prime requirements for this array design process, reducing redundancy will guide the genetic algorithm toward the desired solution. To measure redundancy the co-array is created by autocorrelation of the array geometry and then the co-array lags are summed.

Interferometers used in direction finding can have spatial aliasing or grating lobes. This causes ambiguity in the measurement of the signal's angle of arrival. Ambiguity can be resolved if there are separable and evenly spaced traces in the ambiguity diagram. This criterion provides a measure of the traces separability and consistency by locating the lines, assessing their spacing, and measuring their mean square error.

The genetic algorithm according to the instant embodiment begins operation with the simulation of an operator-selected number of randomized small array configurations. These are evaluated against fitness criterion and scored using fuzzy logic. The single best-fit genome's description and the poplation's average scores are updated to a file for tracking generation history. The best-fit genomes are assigned a higher probability of mating to produce the next generation. The mating takes half the gene set from each parent, one contributes the first half the next the other half, and combines them creating new genomes for the next generation. A mutation function is activated at this stage and introduces slight randomness in some of the genes. As the overall population scores well the size of the genome is increased. Final genome size is consistent with the desired array resolution requirement.

Figure 3:
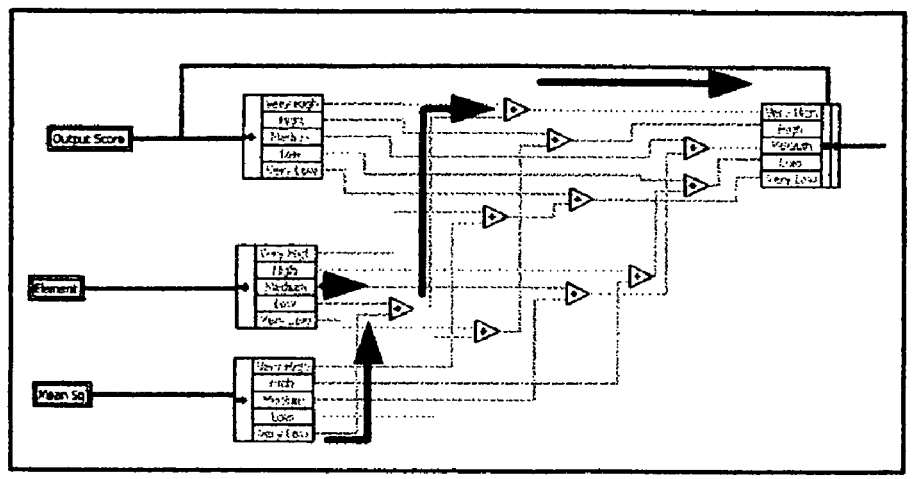
FIG. 3 is an illustrative schematic of a fuzzy logic scorer according to an embodiment of the invention, showing pairwise combination of fuzzified fitness criteria.
Figure 4:
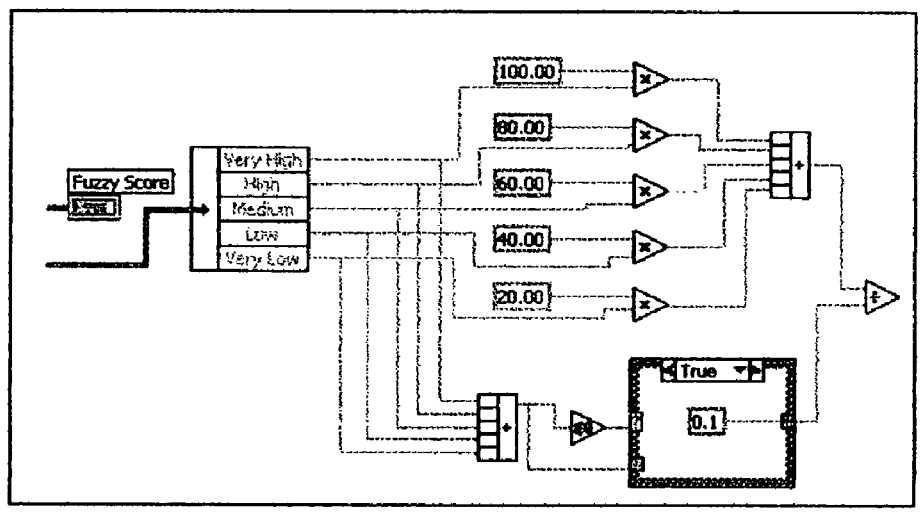
FIG. 4 is an illustrative schematic of a fuzzy logic scorer according to an embodiment of the invention, showing fuzzy logic score defuzzification by centroid method.

Fuzzy logic processing according to the instant embodiment has three steps. Fuzzification of criterion measurements using triangular membership functions. Illustrative triangular membership functions map input values to a number of common fuzzy sets. By this operation, the input value thereof is fuzzified to one ore more of the fuzzy sets. Pair-wise criterion combination using fuzzy logic rules is shown by way illustrative schematic in FIG. 3, and defuzzification to final score, shown by way of illustrative schematic in FIG. 4. Fuzzy logic scorer 20 includes, for example, fuzzy logic as shown in FIG. 3 and/or FIG. 4.

Triangular membership functions were constructed and individually tuned for each fitness criterion. In operation each fitness criterion is measured, fuzzified and then pair-wise combined using AND rules here for simplicity. Finally the genome's fuzzy score is defuzzified using the centroid method. Each fuzzified value of the membership function is multiplied by its centroid, the resultant products are summed and the fuzzified values are separately summed. The final score is obtained by dividing the sum-of-products by the sum-of-membership function values, again referring to FIG. 4. This score is used to assign that genome or antenna a probability rank for mating and producing the next generation.

Obviously, many modifications and variations of the instant invention are possible in light of the above teachings. It is therefore to be understood that the scope of the invention should be determined by referring to the following appended claims.

What is claimed is:

1. A method comprising:
(a) scoring a plurality of genomes using fuzzy logic-based fitness criteria to obtain a genomic score for each genome of the plurality of genomes and an average generational score, wherein each genome of the first plurality of genomes comprises at least one of an apparatus, a process, and an article of manufacture, wherein each genome comprises at least one gene, each gene comprising at least one allele;
(b) eliminating any genome of the plurality of genomes having a score below a level to provide a remaining plurality of genomes;
(c) generating another plurality of genomes by mating the remaining plurality of genomes using a genetic algorithm; and
(d) repeating steps (a) through (c) until the average generational score achieves an asymptote thereby yielding a plurality of optimized genomes.

2. The method according to claim 1, wherein the fuzzy logic-based fitness criteria comprise at least one of a plurality of disparate units of measurement, a plurality of disparate dynamics, and at least one design methodology.

3. The method according to claim 2, wherein the at least one design methodology comprises resolution, redundancy elimination, differential geometry, Chinese remainder theorem, symmetric number system, and pair-wise relatively prime numbers system.

4. The method according to claim 1, wherein step (c) comprises at least one of:
eliminating the gene in the remaining plurality of genomes;
adding at least one new fitness criterion to the fuzzy logic-based fitness criteria;
introducing at least one of a new gene and a new allele to characterize each genome of the remaining plurality of genomes; and
wherein the at least one gene comprises at least one of an active gene and an inactive gene, one of inactivating the active gene and activating the inactive gene of the at least one gene to generate at least one mutated genome of the remaining plurality of genomes.

5. The method according to claim 1, further comprising:
assigning to each genome of the remaining plurality of genomes a relative probability of mating with another genome of the remaining plurality of genomes.

6. The method according to claim 5, wherein the assigned relative probability is higher for higher scoring genomes of the remaining plurality of genomes than for lower scoring genomes of the remaining plurality of genomes.

7. The method according to claim 1, wherein said scoring step (a) comprises:
fuzzifying fitness criterion measurements using a plurality of membership functions;
generating a plurality of pair-wise fitness criterion combinations using at least one of fuzzy associative memory and at least one fuzzy logic rule; and
defuzzifying a fuzzy score for each genome of the plurality of genomes.

8. The method according to claim 7, wherein said defuzzifying step is performed using at least one of a centroid method, an average of maxima method, a center of singleton method, a mean of maximum method, a smallest of maximum method, and a largest of maximum method.

9. The method according to claim 1, wherein said apparatus comprises at least one of an antenna and an antenna array.

10. The method according to claim 9, wherein said antenna comprises at least one of a direction-of-arrival interferometer linear array, a direction-of-arrival interferometer circular array, a direction-of-arrival interferometer planar array, and a direction-of-arrival interferometer volumetric array.

11. The method according to claim 1, wherein the at least one gene comprises an array element position, wherein an active gene represents an active array element and an inactive gene represents an inactive array element.

12. An apparatus comprising:
a genetic processor receiving a plurality of genomes, each genome of the first plurality of genomes comprising at least one of a device, a method, and an article of manufacture, wherein each genome comprises at least one gene, each gene comprising at least one allele; and
a fuzzy logic scorer communicating with the genetic processor to score the plurality of genomes using fuzzy logic-based fitness criteria thereby obtaining a genomic score for each genome of the plurality of genomes and an average generational score,
wherein said genetic processor eliminates any genome of the plurality of genomes having a score below a level to provide a remaining plurality of genomes and generates another plurality of genomes by mating the remaining plurality of genomes using a genetic algorithm.

13. The apparatus according to claim 12, wherein the fuzzy logic-based fitness criteria comprise at least one of a plurality of disparate units of measurement, a plurality of disparate dynamics, and at least one design methodology.

14. The method according to claim 13, wherein the at least one design methodology comprises resolution, redundancy elimination, differential geometry, Chinese remainder theorem, symmetric number system, and pair-wise relatively prime numbers system.

15. An apparatus according to claim 12, further comprising:
a mutation generator communicating with said genetic processor and at least one of
eliminating the gene in the remaining plurality of genomes;
introducing at least one of a new gene and a new allele to characterize each genome of the remaining plurality of genomes; and
wherein the at least one gene comprises at least one of an active gene and an inactive gene one of inactivating the active gene and activating the inactive gene of the at least one gene in at least one mutated genome of the remaining plurality of genomes.

16. The apparatus according to claim 12, wherein said genetic processor assigns to each genome of the remaining plurality of genomes a relative probability of mating with another genome of the remaining plurality of genomes.

17. The apparatus according to claim 16, wherein the assigned relative probability is higher for higher scoring genomes of the remaining plurality of genomes than for lower scoring genomes of the remaining plurality of genomes.

18. The apparatus according to claim 12, wherein said fuzzy logic scorer at least one of
fuzzifies fitness criterion measurements using at least one membership function;
generates a plurality of pair-wise fitness criterion combinations using at least one fuzzy logic rule; and
defuzzifies a fuzzy score for each genome of the plurality of genomes using a centroid method.

19. The apparatus according to claim 18, wherein the at least one membership function comprises one of at least one trapezoidal membership function, at least one sigmoidal membership function, and at least one triangular membership function.

20. The apparatus according to claim 12, wherein said devices comprises at least one of an antenna and an antenna array.

21. The apparatus according to claim 20, wherein said antenna comprises at least one of a direction-of-arrival interferometer linear array, a direction-of-arrival interferometer circular array, a direction-of-arrival interferometer planar array, and a direction-of-arrival interferometer volumetric array.

22. The apparatus according to claim 12, wherein the at least one gene comprises an array element position, wherein an active gene represents an active array element and an inactive gene represents an inactive array element.

* * * * *